United States Patent [19]

Roulin

[11] Patent Number: 4,948,982

[45] Date of Patent: Aug. 14, 1990

[54] DEVICE FOR DETECTING A MISSING COPY BY DETECTING THE PRESENCE OR ABSENCE OF A COLORED AREA ON A SURFACE

[75] Inventor: Daniel Roulin, St. Luc, Canada

[73] Assignee: Somerville Packaging, Montreal, Canada

[21] Appl. No.: 375,349

[22] Filed: Jul. 3, 1989

[51] Int. Cl.⁵ .......... G01N 21/86

[52] U.S. Cl. .......... 250/548; 101/181

[58] Field of Search .......... 250/223 R, 548, 557, 250/561; 235/465, 469, 476; 101/181, 211, 486

[56] References Cited

U.S. PATENT DOCUMENTS

| | | | |
|---|---|---|---|
| 3,858,052 | 12/1974 | Luska | 250/548 |
| 4,147,104 | 4/1979 | Zernov et al. | 101/181 |
| 4,266,123 | 5/1981 | Friberg | 250/548 |
| 4,363,271 | 12/1982 | Horst | 250/548 |
| 4,528,630 | 7/1985 | Sargent | 250/557 |
| 4,546,700 | 10/1985 | Kishner et al. | 101/181 |
| 4,679,071 | 7/1987 | Kitagawa | 101/181 |
| 4,798,136 | 1/1989 | Tittgemeyer et al. | 101/181 |
| 4,808,832 | 2/1989 | Doggett | 250/557 |
| 4,857,745 | 8/1989 | Gough | 101/181 |

*Primary Examiner*—David C. Nelms
*Assistant Examiner*—Stephone B. Allen
*Attorney, Agent, or Firm*—Bachman & LaPointe

[57] ABSTRACT

An optical scanner scans the surface of printed material at a particular position of the surface to determine if the surface is properly marked. The output level of the scanner at that position is compared with the output level of a differential signal level generator. If the two levels are substantially the same, then no error is indicated. If the two levels are different, then an error is indicated and the process is stopped to correct the error.

17 Claims, 7 Drawing Sheets

DEVICE FOR DETECTING A MISSING COPY BY DETECTING THE PRESENCE OR ABSENCE OF A COLORED AREA ON A SURFACE

BACKGROUND OF INVENTION

1. Field of the Invention

The invention relates to apparatus for detecting the presence or absence of a mark. More specifically, the invention relates to such an apparatus for detecting the presence or absence of a coloured area at a predetermined position on a surface having a background of a colour different from the coloured area, or of a different shade of the same colour as the coloured area.

2. Description of Prior Art

In many instances, it is necessary that marks be located at specific positions on carriers. For example, in the printing arts, texts or designs must be located at specific positions on cartons.

In the printing of complex folding cartons, there is often a need to go through several types of printing and converting operations to provide cartons which have outer surfaces with predetermined texts and/or designs. As the number of converting steps increases, the possibility of having some of the sheets, which are subsequently folded into the cartons, where one or several of the processes have been omitted increases significantly. In some markets, the absence of some colour, text copy or other elements is not only unacceptable from an aesthetic point of view but can lead to stiff legal penalties. For example, the warning notice on cigarette packages and the UPC symbol on pharmaceutical products.

The prior art has teachings which attempt to solve some of the problems encountered above. For example, U.S. Pat. No. 3,735,097, Zeitlin, May 22, 1973, U.S. Pat. No. 4,383,275, Sasaki et al, May 10, 1983 and U.S. Pat. No. 4,392,056, Weyandt, Jul. 5, 1983. The '097 patent teaches a device for detecting the presence of embossing on background material. The '275 patent normalizes to a white level and this level is used to compensate for the non-uniformity of the sensor outputs. The '056 patent is a detector for detecting control markings of an article such as a moving web.

SUMMARY OF INVENTION

It is an object of the invention to provide an apparatus for detecting the presence or absence of a mark.

It is a more specific object of the invention to provide an apparatus which detects the presence or absence of a coloured mark at a specific position on carriers of equal size.

It is an even more specific object of the invention to detect the presence or absence of text at a specific position on blanks for forming folding cartons.

In accordance with the invention there is provided an apparatus for detecting the presence or absence of a coloured area at a predetermined position on a surface having a background of a colour different from the coloured area, or of a different shade of the same colour as the coloured area. The apparatus includes an optical scanner means, having an output means, for scanning the surface and providing an output signal level, at the output means of the scanner means, representative of the colours being scanned. A comparator means has a first input means, a second input means and an output means, and the output means of the optical scanner means is connected to the first input means of the comparator means. A background signal level generator means generates a signal level representative of the background colour, the background signal level generator means having an output means connected to the second input means of the comparator means. Whereby, there is provided at the output means of the comparator means a differential signal level representative of the difference in levels between the output signal level and the background signal level. A differential signal level generator means generates a signal level corresponding to a preset differential level representative of the desired difference in levels between the output signal level and the background signal level, the preset signal level generator means having an input means and an output means. An indicator means has a first input means and a second input means and output means, the output means of the comparator means being connected to the first input means of the indicator means, and the output means of the differential signal level generator means being connected to the second input means of the indicator means. Thus, equal to the preset differential level, the indicator means will indicate the presence of the coloured area at the predetermined position, and when the differential signal level is different from the preset differential level, the indicator means will indicate the absence of the coloured area at the predetermined position.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
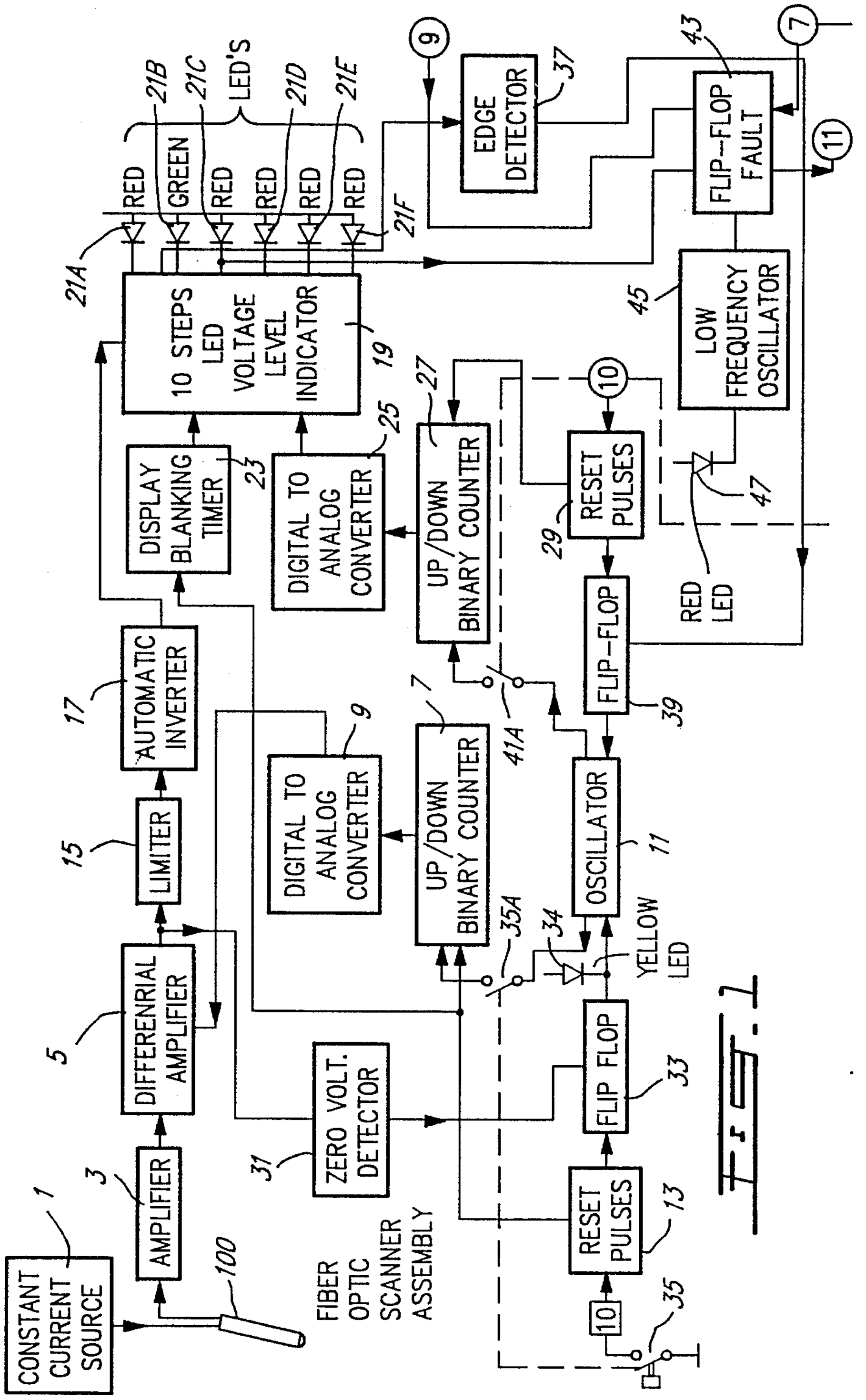
FIG. 1 is a block diagram of the colour detection function of the apparatus.

Referring to FIG. 1, there is provided a fiber optic scanner 100 which preferably comprises a bifurcated fiber optics bundle such as, for example, the BT 23 series of Banner Engineering Corp., Minneapolis, Minn. One end of the bundle is connected to an incandescent light source and transmits a light beam to a target. The other end of the bundle transmits light reflected from the target to a photo transistor. The supply for the light is provided by a constant current source 1. Both the light source and the photo transistor are in a fiber optic interface such as, for example, the F02BG of Banner Engineering Corp., Minneapolis, Minn. A focusing lens is installed on the end of the fiber optic bundle which transmits the light beam to converge the light to an adjustable spot whose diameter can be varied from 0.040 to 0.125 inches. The lens may comprise an L10 of Banner Engineering Corp., Minneapolis, Minn.

The optical scanner means 100 has an output means which is connected to an input means of an amplifier 3. Amplifier 3 has an output means, and the output means of amplifier 3 is connected to one input means of a comparator which has a second input means and an output means. The comparator may comprise, for example, a differential amplifier 5 having a negative input terminal which comprises one of the input means of the comparator means to which the output means of amplifier 3 is connected, and a positive input terminal comprising the second input means of the comparator means. The output terminal of the differential amplifier 5 comprises the output means of the comparator means.

Connected to the positive input terminal of the differential amplifier 5 is a background signal level generator means consisting of an up/down binary counter 7 and a digital-to-analog converter 9. The up/down binary counter 7 is driven by oscillator 11, and is triggered by monostable 13 as will be described below.

The output terminal of differential amplifier 5 is connected to the input terminal of limiter 15. The limiter 15 limits the magnitude of the output of the differential amplifier to, for example, 10 volts.

The output terminal of limiter 15 is connected to the input terminal of an automatic inverter 17 whose function is to maintain the output of the differential amplifier at a common polarity, for example, at a positive polarity in all cases.

The output terminal of the automatic inverter 17 is connected to one input terminal of an indicator means which includes a multi-level step LED voltage arrangement 19, having a plurality of steps, and a plurality of LEDs 21A, 21B, 21C, 21D, 21E and 21F. Each of the LEDs is connected to a different one of the steps of the multi-level step LED voltage arrangement 19.

The multi-level step LED voltage arrangement 19 also includes a blanking input terminal connected to an output terminal of display blanking timer 23. The multi-level step LED voltage arrangement further includes a second input terminal connected to the output terminal of a differential signal level generator means which comprises digital-to-analog converter 25 and up/down counter 27. The up/down counter 27 is also driven by the oscillator 11 and is triggered by mono-stable 29 as will be described below.

The up/down counter 7 is set in an up count mode (increasing) so that the output of the digital-to-analog converter 9 is a linearly increasing analog signal. A means for detecting and arresting the increase includes a means for detecting a zero level at the output terminal of differential amplifier 5 comprising a zero signal detector 31, and a means for arresting the increase at the output of the digital-to-analog converter 9 comprising a flip-flop 33. The input terminal of the zero signal detector 31 is connected to the output terminal of the differential amplifier 5, and the output terminal of the zero signal detector 31 is connected to the CLEAR terminal of the flip-flop 33. The output terminal of flip-flop 33 is connected to a STOP terminal of the oscillator 11, and the START terminal of flip-flop 33 is connected to an output terminal of monostable 13. The output terminal of monostable 13 is connected to a RESET terminal of up/down counter 7, switch 35 provides a start signal to monostable 13, and it also closes electronic switch 35A to connect oscillator 11 to the CLOCK terminal of up/down counter 7.

Up/down counter 27 is set in the down count mode so that the output of digital-to-analog converter 25, whose input terminal is connected to the output terminal of up/down counter 27, is a linearly decreasing signal. A means for detecting and arresting the decrease includes a means for detecting the decrease, specifically, edge detector 37 whose input terminal is connected to an output terminal of the multi-level step LED voltage arrangement between the top and second from top steps thereof. The output terminal of edge detector 37 is connected to a CLEAR terminal of flip-flop 39. The START terminal of flip-flop 39 is connected to an output terminal of monostable 29, and the output terminal of flip-flop 39 is connected to a second STOP terminal of oscillator 11. Switch 41 provides a reset pulse to monostable 29, and it also electronically closes switch 41A whereby oscillator 11 is connected to up/down counter 27.

A fault is detected in fault detector 43 having an input terminal connected to the third from top step of the multi-level step LED voltage arrangement 19. One output terminal of fault detector 43 is connected to a low frequency oscillator 45 and a red LED 47. A second output of fault detector 43 is connected to multi-unit fault detector 49 (see FIG. 2). The multi-unit fault detector 49 can handle nine apparatus of the type illustrated in FIG. 1, and a separate input terminal is provided in 49 for a like output terminal of a fault detector 43 in each of the nine apparatus. The output terminal of multi-unit fault detector 49 is connected to a CLOCK terminal of flip-flop 51. The output terminal of flip-flop 51 is connected to a latch terminal of flip-flop 53 whose output terminal is connected to solid-state relay 55 and a START terminal of low frequency oscillator 57. The output terminal of low frequency oscillator 57 is connected to an input terminal of buzzer 59. Solid-state relay 55 is connected to circuitry for stopping the converting machine, and a bypass key 61 is provided to override the solid-state relay 55.

The converting machine will, of course, include means for moving the surface until the predetermined position of the surface underlies the optic scanner means. The converting machine is adapted to move the surface so that the predetermined position underlies the optical scanner means at a predetermined part of each cycle of operation. Means for detecting the predetermined part of each cycle consists of a position module means comprising dual latches 63 and 65. Dual counters 67 and 69, and comparator means comprising magnitude comparators 71 and 73 record counts which are representative of distance travelled by the surface relative to a fixed point. As can be seen, an output terminal of counter 67 is connected to an input terminal of latch 63 and to an input terminal of comparator 71. An output terminal of latch 63 is connected to a second input terminal of comparator 71. In a like manner, an output terminal of counter 69 is connected to an input terminal of latch 65 and an input terminal of comparator 73. The output terminal of latch 65 is connected to the second input terminal of comparator 73. An output terminal of each of counter 67, latch 63 and comparator 71 is connected to an input terminal, respectively, of counter 69, latch 65 and comparator 73. RESET terminals of latches 63 and 65 are connected to switch 41.

The position module also includes a pulse generator 75 which has three outputs. One of these outputs provides an index pulse for every cycle of operation of the converting machine. The other two outputs are square signals separated by a 90° phase difference and providing 1800 pulses per cycle. To provide the index pulse and the 1800 pulse per cycle signals, a shaft of the pulse generator 75, which has an encoded disc mounted on it, is connected to a moving part of the converting machinery which completes one revolution for each cycle of the converting machinery.

The three signals are shaped in pulse conditioner 77 whose input terminals are connected to respective ones of the output terminals of pulse generator 75. Pulse conditioner 77 also has three output terminals, two of which are connected to the input terminals of pulse doubler 79. The two output terminals of pulse conditioner 77 which are connected to the input terminals of pulse doubler 79 correspond with the output terminals of pulse generator 75 providing the 90° phase shifted 1800 pulse per cycle signals above-referred to. The output of 79 is thus a signal of 3600 pulses per cycle, and the output terminal of pulse doubler 79 is fed to CLOCK terminal of counter 67. The RESET terminal of counter 67 is connected to the third output terminal of pulse conditioner 77 whereupon the counters 67 and 69 will be reset after each cycle of operation of the converting machine.

The output terminal of comparator 73 is connected to an input terminal of monostable 81 which has one output terminal connected to LED 83 and a second output terminal connected to a CLOCK terminal of flip-flop 43. The output terminal of comparator 73 is also connected to a CLOCK terminal of flip-flop 51, and a RESET terminal of flip-flop 51 is connected to an output terminal of opto coupler 85. A second output terminal of opto coupler 85 is connected to a control circuit 87 for LEDs 89 and 91. The input terminal of opto coupler 85 is connected to the output of a reflective scanner (not shown) whose purpose is to detect the presence of a sheet in the equipment. If no sheet is detected, the equipment can operate without stopping. When a sheet is detected, the system switches in automatic mode by itself, cancelling the action of all setting push-buttons (35 and 41 in FIGS. 1 and 2), and switches a manual indicator LED to the automatic indicator LED on a front panel (also not shown). If all inputs to the arrangement 49 are at the same level, indicating no fault on each channel, the output remains low and flip-flop 51 does not change status. The sheet is accepted and the equipment keeps running. If a fault is detected in one of the channels, the output of arrangement 49 rises to a high level and allows flip-flop 51 to change status. The output of the flip-flop 51 is fed to flip-flop 53 which is used as a latch. The output of flip-flop 53 is connected to a solid-state relay 55 which is wired with the stop circuitry of the equipment. At the same time, the low frequency oscillator 81 activates an audible alarm. A by-pass key is also provided for machine set-up. The use of two flip-flops (51 and 53) allows the equipment to run one extra cycle before stopping. In the case of a die cutter, this allows the defective sheet to be cut and ejected from under the platen into the stripping section where it can readily be removed and examined.

A RESET terminal of flip-flop 53 is connected to an output terminal of opto coupler reset 93 as well as to a RESET terminal of flip-flop 43. The input terminal of opto coupler reset 93 is connected to the STOP button (not shown). To restart the equipment, the STOP button must first be pressed and released. This activates opto coupler 93 which in turn resets flip-flop latch 53 and flip-flop 43. Then the START button is pressed and the operation resumes normally until another defective sheet is found.

In operation, the apparatus works as follows:

1. BACKGROUND LEVEL SETTING

In order to set the background level in the digital-to-analog converter 9, the optical scanner means 100 is directed at the background of the surface. Activation of switch 35 will cause monostable 13 to provide up/down counter 7 with a reset pulse and set flip-flop 33, and also illuminate LED 34. This will also electronically close switch 35A, whereby oscillator 11 is connected to the up/down counter 7. Accordingly, the output of digital-to-analog converter 9 will be a linearly increasing signal.

In the meantime, the optical scanner means 100 will provide, through amplifier 3, a signal level indicative of the colour of the background, to the negative terminal of differential amplifier 5. The linearly increasing signal at the output of digital-to-analog converter 9 is provided to the positive terminal of the differential amplifier.

When the magnitude of the linearly increasing signal is equal to the magnitude of the signal representative of the background colour, there will be a zero output at the output terminal of the differential amplifier. This will be detected by the zero signal detector 31.

When the zero signal is detected by zero signal detector 31, it will provide a CLEAR signal to flip-flop 33. Accordingly, flip-flop 33 will provide an output pulse which will provide a STOP signal to oscillator 11. Accordingly, the up count of up/down counter 7 will be arrested so that the magnitude of the signal at the output of the digital-to-analog converter 9 will remain at the same level as the signal at the output of the optical scanner means when it is directed at the background. This signal level will hereinafter be referred to as the detected background signal level.

2. SETTING COLOUR SIGNAL LEVEL

With the digital-to-analog converter 9 set to the detected background signal level, when the optical scanner means is directed at a colour different from the background colour, then the output of the differential amplifier is the signal level representative of the different colour with the background colour signal level subtracted therefrom. This signal is hereinafter referred to as the differential signal level.

With the optical scanner directed at the predetermined position, to thereby provide an output representative of the colour of the predetermined position, the differential signal level will comprise a preset differential level, and it is necessary to set digital-to-analog converter 25 with this preset differential level.

In order to accomplish this, the optical scanner means 100 is directed at the predetermined position and switch 41 is activated. Activation of switch 41 will cause monostable 29 to provide up/down counter 27 with a RESET pulse and set flip-flop 39, and will also electronically close switch 41A whereby oscillator 11 is connected to the up/down counter 27. The up/down counter begins its count in the down count mode, so that the output of digital-to-analog converter 25 is a linearly decreasing signal. At the onset, the output of 25 will be larger than the preset differential level. On the other hand, because the fiber optic scanner means is directed at the predetermined position, the output of automatic inverter 17 is equal to the preset differential level. The outputs of automatic inverter 17 and digital-to-analog converter 25 are compared in a comparator in indicator 19. When the output of the indicator falls to between the top and the second from top steps, i.e., when the output of digital to analog converter 25 is substantially equal to the preset differential level, an output signal will be provided by the indicator 19 to edge detector 37.

Edge detector 37 will now provide a signal to the CLEAR terminal of flip-flop 39 which will, in turn, provide a pulse to the STOP terminal of oscillator 11. Once again, the oscillator will stop so that the count on up/down counter 27 will cease and the level of digital-to-analog converter 25 will remain at substantially the preset differential level.

3. SETTING PREDETERMINED POSITION PARAMETERS ON POSITION MODULE MEANS

To set the predetermined position parameters on the position module, that is, the position when the optical scanner overlies the predetermined position on the surface, the converting machine is turned on so that the surface begins to move towards the optical scanner. Before the predetermined position underlies the optical scanner, an index pulse will be sent to counters 67 and 69 to clear them to zero once per machine cycle. Following this, the counters will now count the pulses provided to them from pulse doubler 79 until such time as the predetermined position underlies the optical scanner. At this time, switch 41 is activated so that the counts in counters 67 and 69 are stored in latches 63 and 65. Thus, there is stored in latches 63 and 65 a count, relative to an index pulse, which is representative of the predetermined position. This count is hereinafter referred to as the predetermined position parameters. The operation of setting the predetermined position parameters takes place simultaneously with step 2 above as it is necessary to store the predetermined position parameters, representative of the predetermined position or the position at which the presence of graphics elements or text on the surface must be monitored, simultaneously to determining the level of the graphics elements or text.

It will be apparent that the count on counters 67 and 69 is representative of the distance travelled by the surface, and specifically, the distance travelled relative to the position at which an index pulse is initiated. Thus, the count stored in latches 63 and 65, that is, the predetermined position parameters, are indicative of the distance which a surface must travel, relative to the position at which an index pulse was initiated, in order for the predetermined position to underlie the fiber optic scanner. The count in the latches can therefore also be referred to as a predetermined distance relative to a fixed point.

4. PRODUCTION RUN

In a production run, the optical scanner means will first be directed at the background so that the output of the differential amplifier will, of course, be different from the preset differential level. However, a fault will not be detected at this time as flip-flop 43 of the fault detector will not have received the clocking pulse.

Counters 67 and 69 will count pulses and provide the reading of their count to the magnitude comparators 71 and 73 respectively. The magnitude of the counted pulses are compared with the content (stored counts) of latches 63 and 65, and the output of the comparators will be different from zero until such time as the value of the counted pulses is equal to the counts stored in the latches. When that happens, then comparator 73 will provide an output to monostable 81 which will provide a clocking pulse to flip-flop 43. The output of comparator 73 also clocks flip-flop 51.

With flip-flops 43 and 51 ready, the apparatus is now in a position to detect a fault. If the differential signal level at the output of automatic inverter 17 is greater than or equal to the preset differential level, then a fault will not be detected, i.e., the coloured area is detected at its predetermined position. If the differential signal level at the output of automatic inverter 17 is substantially different from the preset differential level, then the output of the comparator in indicator 19 will fall to a level at or below the third from top step. This state will be detected in flip-flop 43 which will provide a START signal to oscillator 45 to illuminate LED 47. It will also provide a signal to multi-unit fault detector 49 which provides a high level to the data input of flip-flop 51 which sets latch 53. This turns on the solid-state relay 55 to turn off the converting machine and it also sets the low frequency oscillator 57 to provide a buzzing sound in the buzzer 59. Accordingly, there is provided an audible alert from the buzzer 59. The visible alert of LED 47 indicates the specific one of the apparatus feeding multi-unit fault detector 49 in which the fault has been detected.

To restart the equipment, a STOP button (not shown) and connected to the input of opto coupler reset 93 is pressed. This activates opto coupler 93 which in turn resets flip-flop latch 53 and fault indicator flip-flop 43. Then the START button (not shown) is pressed and the operation resumes normally until another defective sheet is found. Activation of opto coupler 85 also illuminates the LEDs 89 or 91. This is done by a retroflective scanner (not shown) by detecting the presence of a sheet under the scanner.

Figure 2:
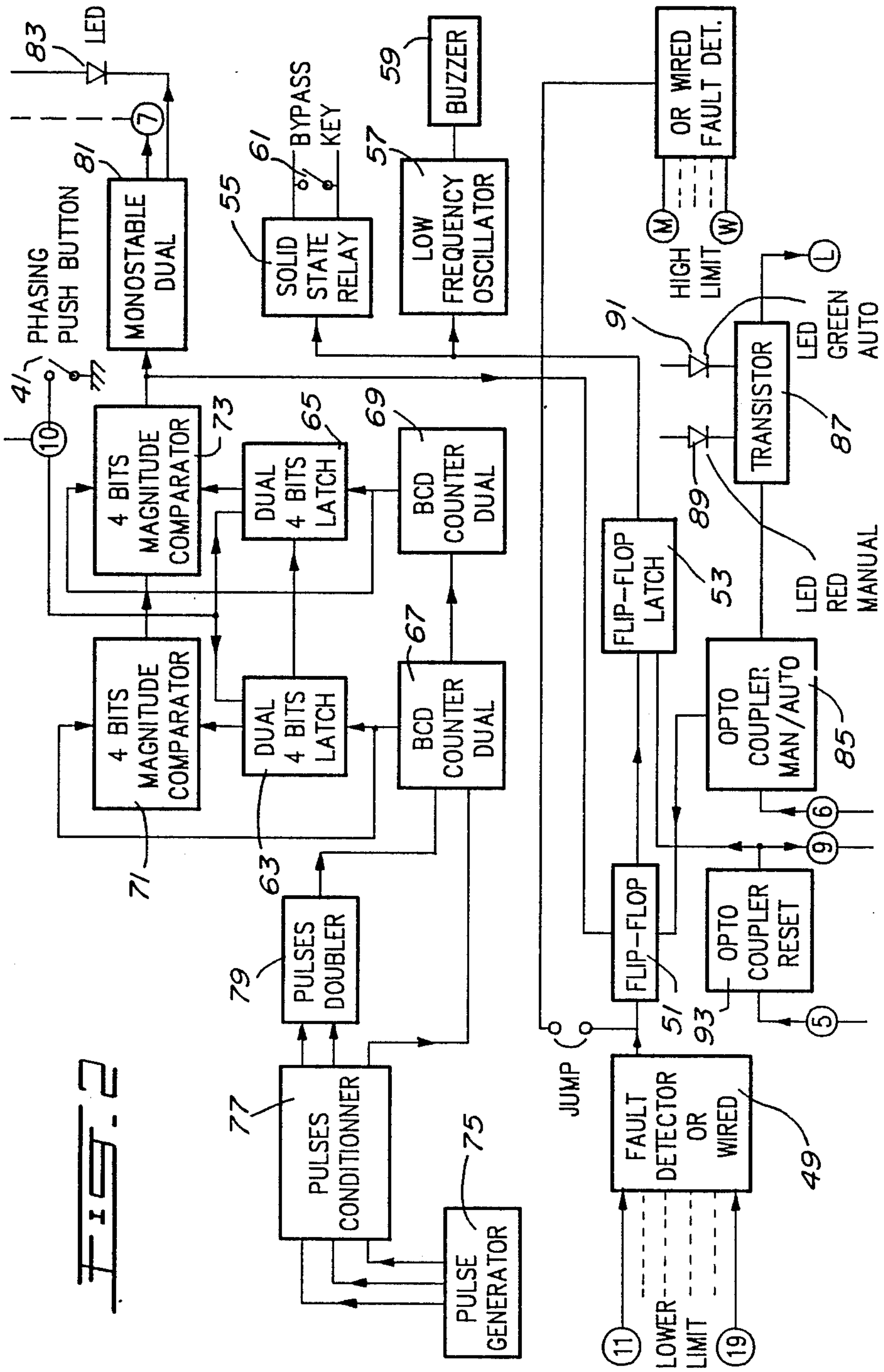
FIG. 2 is a block diagram of the position location and fault detection functions of the apparatus.
Figure 3A:
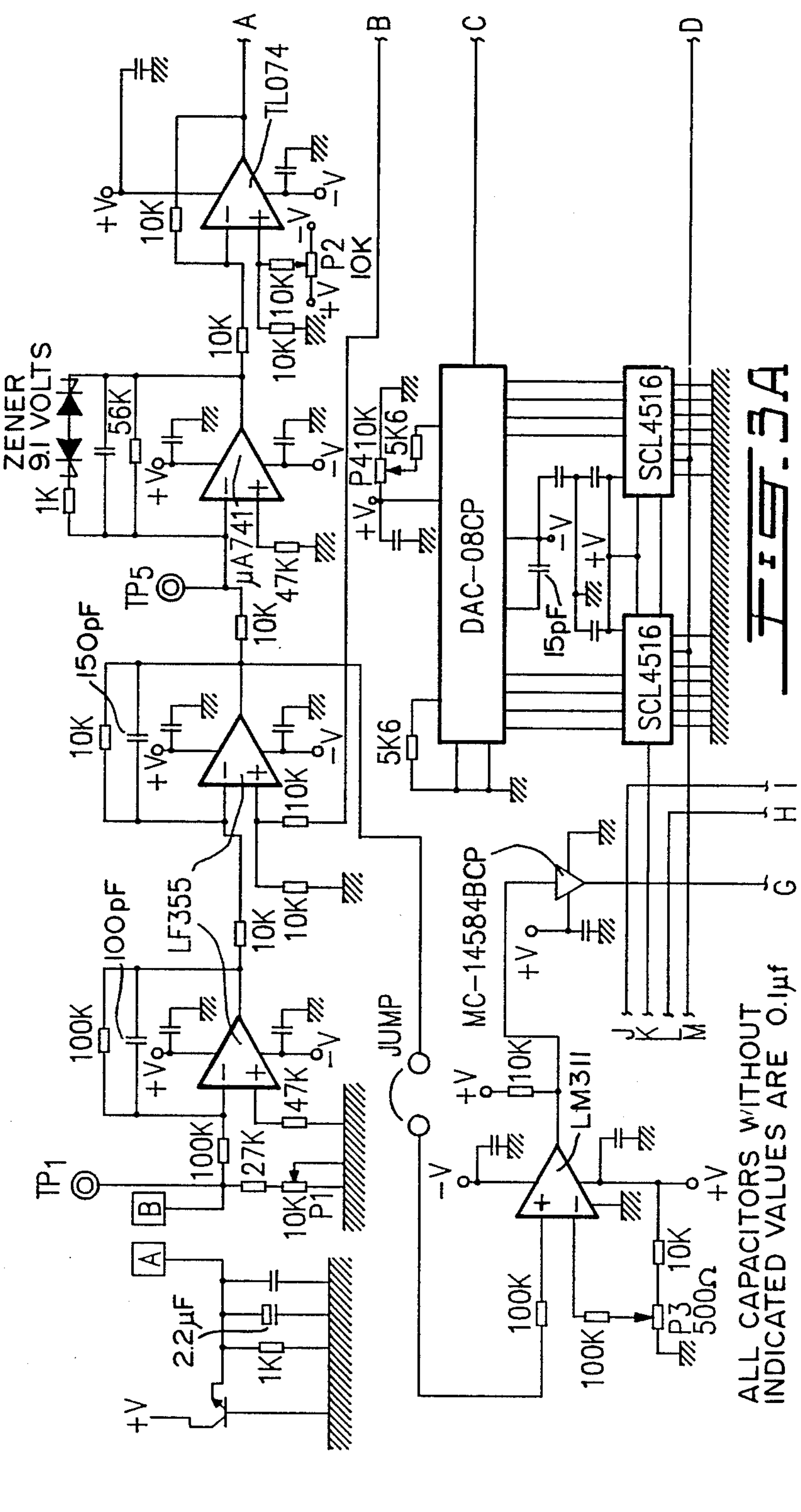
FIGS. 3A, 3B and 3C illustrate a circuit diagram of one embodiment of the block diagram of FIG. 1.
Figure 3B:
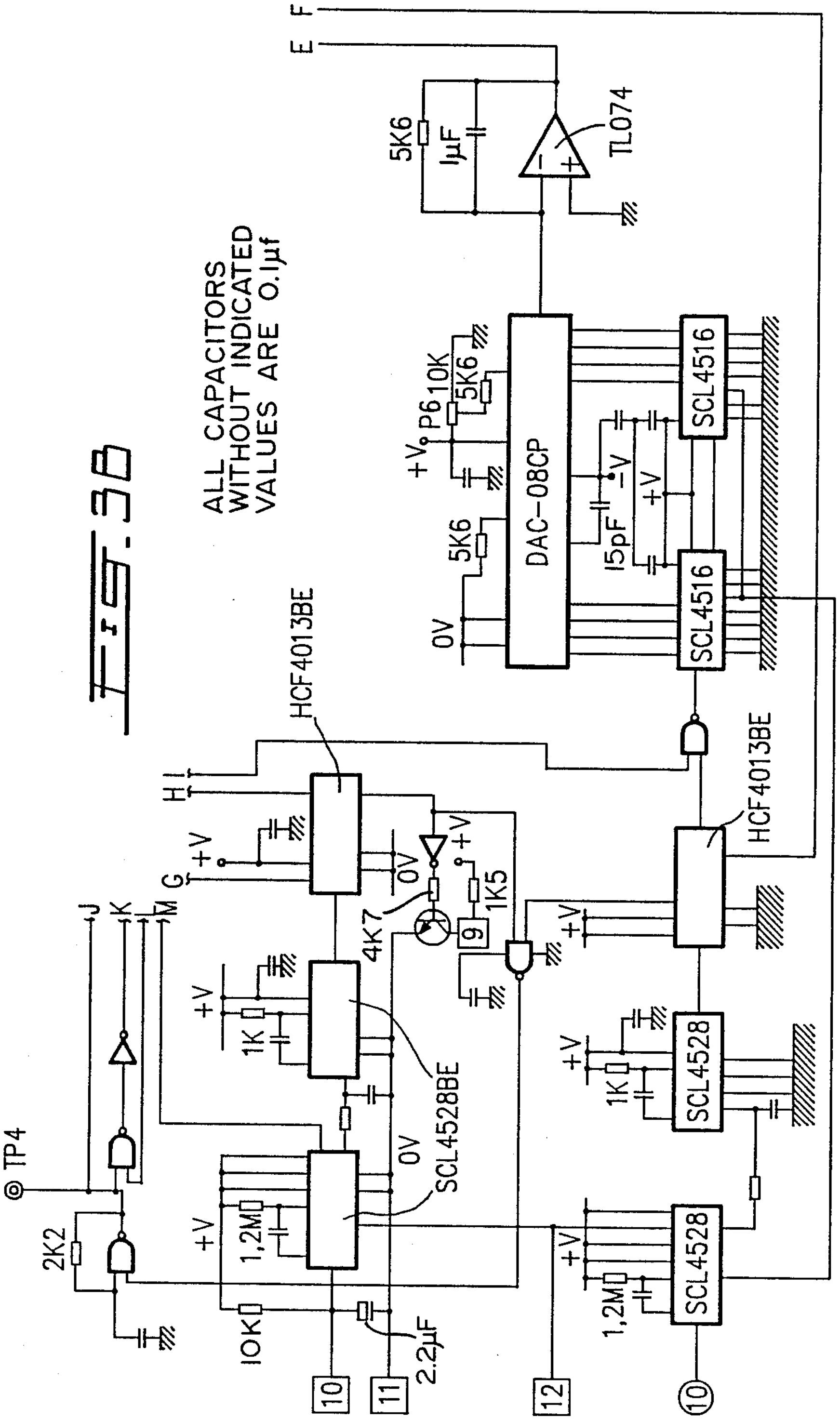
Figure 3C:
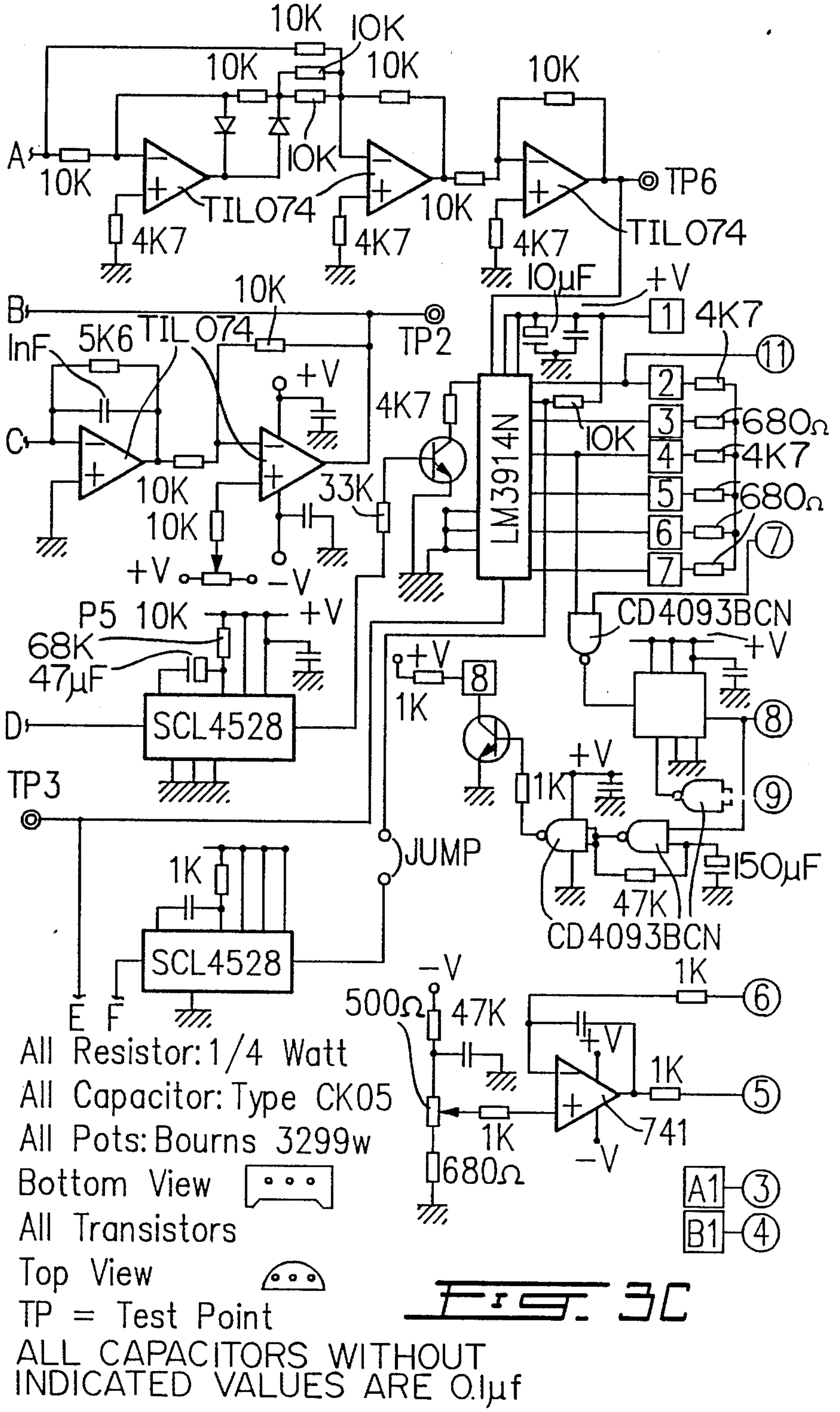
Figure 4A:
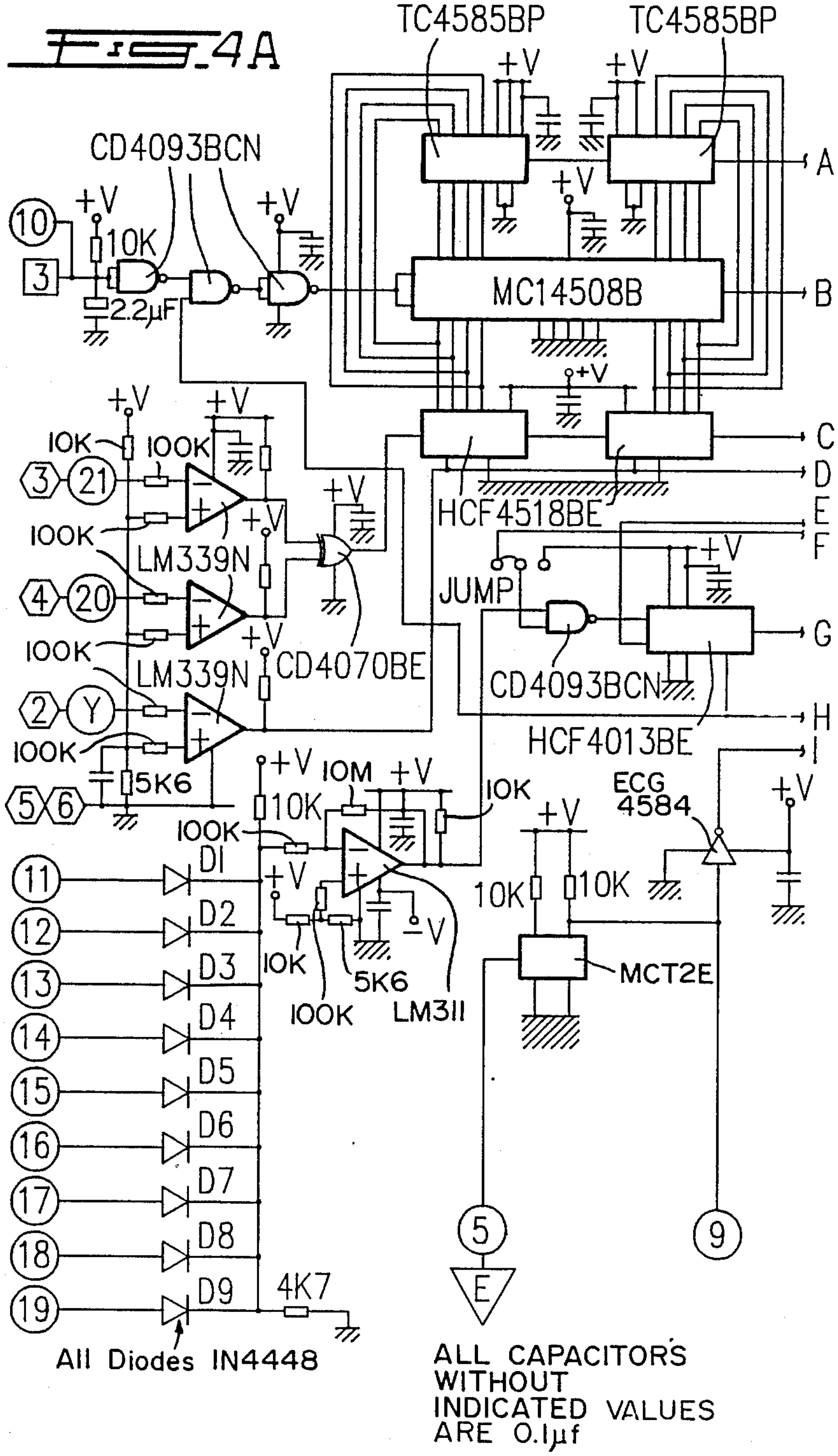
FIGS. 4A and 4B illustrate a circuit diagram of one embodiment of the block diagram of FIG. 2.
Figure 4B:
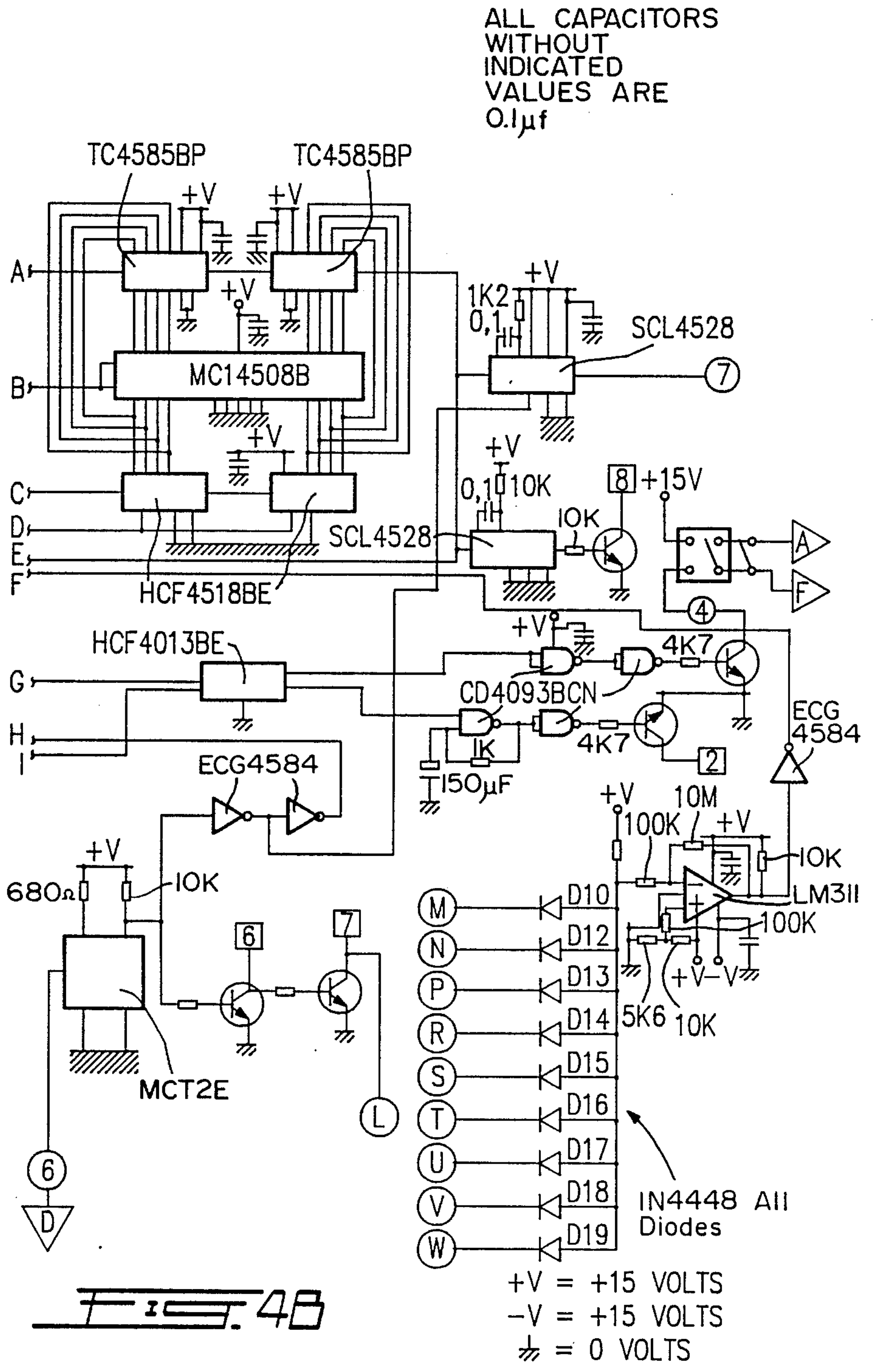

A particular circuit implementation of FIG. 1 is illustrated in FIGS. 3A, 3B and 3C, and a particular circuit implementation of FIG. 2 is illustrated in FIGS. 4A and 4B. The above description, taken together with the circuit diagram, renders an understanding of the operation of the circuit diagram self-evident so that no further description is required.

Because of the background level setting apparatus and process, the present arrangement can distinguish between colours having very little contrast, i.e., brown and black. In fact, the apparatus is sensitive enough to distinguish between two shades of the same colours and can also detect colours on reflective surfaces. This is in comparison with presently available machines which can distinguish only between colours of high contrast, i.e., black and white.

Although a particular embodiment has been above described, this was for the purpose of illustrating, but not limiting, the invention. Various modifications, which will come readily to the mind of one skilled in the art, are within the scope of the invention as defined in the appended claims.

I claim:

1. Apparatus for detecting the presence or absence of a coloured area at a predetermined position on a surface having a background of a colour different from said coloured area, or of a different shade of the same colour as the coloured area;

said apparatus comprising:

an optical scanner means, having an output means, for scanning said surface and providing an output signal level, at said output means of said scanner means, representative of the colours being scanned;

comparator means having a first input means, a second input means and an output means;

said output means of said optical scanner means being connected to said first input means of said comparator means;

background signal level generator means for generating a signal level representative of said background colour, said background signal level generator means having an output means;

said output means of said background signal level generator means being connected to said second input means of said comparator means;

whereby, to provide at the output means of said comparator means a differential signal level representative of the difference in levels between said output signal level and said background signal level;

differential signal level generator means for generating a signal level corresponding to a preset differential level representative of the desired difference in levels between said output signal level and said background signal level, said preset signal level generator means having an input means and an output means;

indicator means having a first input means and a second input means and output means;

the output means of said comparator means being connected to said first input means of said indicator means, and the output means of said differential signal level generator means being connected to said second input means of said indicator means;

whereby, when said differential signal level is substantially equal to said preset differential level, said indicator means will indicate the presence of said coloured area at said predetermined position; and when said differential signal level is different than said preset differential level, said indicator means will indicate the absence of said coloured area at said predetermined position.

2. An apparatus as defined in claim 1 wherein the background signal level of said background signal level generator means increases with time, said background signal level generator means including a STOP input means such that application of a STOP signal to said STOP input means will arrest the increase of said background signal level;

and further including:

means for detecting and arrest-ng said increase for detecting when said background signal level is equal to a detected background signal level and for arresting said increase when said background signal level is equal to said detected background signal level, said means for detecting and arresting said increase having an input means and an output means;

said input means of said means for detecting and arresting said increase being connected to said output means of said comparator means, and said output means of said means for detecting and arresting said increase being connected to said STOP input means of said background signal level generator means;

whereby, to set said background signal level equal to said detected background signal level, said optical scanner means is directed at said background to thereby provide, to said output means of said optical scanner means, and thereby to said first input means of said comparator means, said detected background signal level;

whereby, said detected background signal level is compared, in said comparator means, with said increasing background signal level; and when said background signal level is equal to said detected background signal level, said comparator means will trigger said means for detecting and arresting said increase which will consequently provide a STOP signal to said STOP input means to arrest said increase;

whereupon, said background signal level generator means will maintain said detected background signal level at the output means thereof.

3. An apparatus as defined in claim 2 wherein the signal level of said differential signal level generator means decreases with time, said differential signal level generator means including a STOP input means such that an application of a STOP signal to said STOP input means will arrest the decrease of said signal level of said differential signal level generator means;

means for detecting and arresting said decrease for detecting when said signal level of said differential signal level generator is equal to said preset differential level, and for arresting said decrease when said equality is detected, said means for detecting and arresting said decrease having an input means and an output means, said input means of said means for detecting and arresting said decrease being connected to said output means of said indicator means, and said output means of said means for detecting and arresting said decrease being connected to said STOP input means of said differential signal level generator means;

whereby, to set said signal level of said differential signal level generator means equal to said preset differential level, said optical scanner means is directed at said predetermined position and said detected signal level is applied at said second input means of said comparator means, whereupon, said differential signal level at the output of said comparator means comprises said preset differential level;

whereby, said preset differential level is compared with said signal level of said differential signal level generator means in said indicator means; and when said signal level of said differential signal level generator means falls to said preset differential level, said indicator means will trigger said means for detecting and arresting said decrease to thereby provide said STOP signal to said STOP input means of said differential signal level generator means to arrest said decrease;

whereupon, said differential signal level generator means will maintain said preset differential level at the output means thereof.

4. An apparatus as defined in claim 3 and further including:

fault detecting and indicating means having input means connected to the output means of said indicator means;

whereby, when said differential signal level at the output means of said comparator means is less than said preset differential level, said fault detecting and indicating means will detect and indicate a fault.

5. An apparatus as defined in claim 4 and further including:

means for moving said surface such as to locate said predetermined position under said optical scanner means at a predetermined distance from a fixed point;

position module means for generating a signal representative of said predetermined distance, said position module means having an output means;

distance travelled measuring means for measuring distance travelled by said surface relative to said fixed point and for providing a signal representative of said distance travelled, said distance travelled measuring means having an output means;

signal comparator means having a first input means and a second input means and an output means, said output means of said position module means being connected to said first input means of said signal comparator means and said output means of said distance travelled measuring means being connected to said second input means of said signal comparator means; and means for initiating a detection cycle having an input means, said output means of said time signal comparator means being connected to said input means of said means for initiating a detection cycle;

whereby, when said distance travelled signal is equal to said predetermined distance signal, a detection cycle is initiated.

6. An apparatus as defined in claim 5 wherein said comparator means comprises a differential amplifier, said first input means of said comparator means comprising a negative input terminal of said differential amplifier, said second input means of said comparator means comprising a positive input terminal of said differential amplifier, and said output means of said comparator means comprising the output terminal of said differential amplifier.

7. An apparatus as defined in claim 6 wherein said background signal generator means comprises:

a first binary counter means having a RESET terminal, an input terminal and an output terminal;

a first digital-to-analog converter means having an input terminal and an output terminal, said input terminal of said first digital-to-analog converter means being connected to said output terminal of said first binary counter means, said output terminal of said first digital-to-analog converter means comprising said output means of said background signal generator means and being connected to said positive terminal of said differential amplifier.

8. An apparatus as defined in claim 7 wherein said differential signal level generator means comprises:

a second binary counter means having a RESET terminal, an input terminal and an output terminal;

a second digital-to-analog converter means having an input terminal and an output terminal, said input terminal of said second digital-to-analog converter means being connected to said output terminal of said second binary counter means, said output terminal of said second digital-to-analog converter means comprising said output means of said differential signal level generator means and being connected to said input means of said indicator means.

9. An apparatus as defined in claim 8 wherein said indicator means comprises a multi-level step LED voltage arrangement having a plurality of steps and having a first input terminal comprising said second input means of said indicator means and being connected to said output terminal of said second digital-to-analog converter means, and a second input terminal comprising said first input means of said indicator means and being connected to the output terminal of said differential amplifier;

a plurality of LEDs, the plurality of LEDs being less than or equal to the plurality of steps;

each of said LEDs being connected to a different one of said steps.

10. An apparatus as defined in claim 9 wherein said means for detecting and arresting said increase of said background signal level comprises a zero signal level detector having an input terminal and an output terminal, comprising, respectively, the input means and the output means of said means for detecting and arresting said increase of said background signal level.

11. An apparatus as defined in claim 10 and including means for setting said background signal level equal to said detected background signal level, including:

said zero signal level detector;

a first flip-flop having a RESET terminal, a CLOCK terminal and an output terminal, said CLEAR terminal of said first flip-flop being connected to said output terminal of said zero level detector;

a first initiating switch having an output terminal;

a first reset pulse monostable having a CLEAR terminal, a first output terminal and a second output terminal, said CLOCK terminal of said first reset pulse monostable being connected to said output terminal of said first initiating switch, said first output terminal of said first reset pulse monostable being connected to said CLOCK terminal of said first flip-flop and said second output terminal of said first reset pulse monostable being connected to said RESET terminal of said first binary counter;

an oscillator having a first START/STOP terminal, a second STOP terminal, a first output terminal and a second output terminal, said first START/STOP terminal of said oscillator being connected to said output terminal of said first flip-flop, said first output terminal of said oscillator being connected to said input (CLOCK) terminal of said first binary counter through a first switch activated by said first initiating switch;

whereby, when said first initiating switch is activated, it starts said first reset pulse monostable which in turn resets said first binary counter and sets said first flip-flop, and connects said oscillator to said first binary counter whereby to start an upward count on said first binary counter; and when a zero signal level is detected at the output terminal of said differential amplifier, said zero signal level detector provides a high state to clear said first flip-flop to thereby provide a STOP signal to said oscillator to arrest the oscillator and thereby stop the count of said first binary counter.

12. An apparatus as defined in claim 11 wherein said steps of said multi-level step LED voltage arrangement are arranged in sequential order from a top step to a bottom step and, when the LEDs associated with the top two steps are illuminated, a non-fault condition is indicated; and wherein said means for detecting and arresting said decrease comprises an edge detector having an input terminal and an output terminal, said input terminal of said edge detector being connected between said top two steps.

13. An apparatus as defined in claim 12 wherein said means for setting said signal level of said differential signal level generator means equal to said preset differential level includes;

said edge detector;

said oscillator;

a second flip-flop having a RESET terminal, a CLOCK terminal and an output terminal, the output terminal of said flip-flop being connected to the second START/STOP terminal of said oscillator, said CLEAR terminal of said second flip-flop being connected to the output terminal of said edge detector;

a second initiating switch having an output terminal;

a second reset monostable having a CLOCK terminal, a first output terminal and a second output terminal, said CLOCK terminal of said second reset pulse monostable being connected to said output terminal of said second initiating switch, said second output terminal of said first reset pulse monostable being connected to said CLOCK terminal of said second flip-flop, and said second output terminal of said second reset pulse monostable being connected to the RESET terminal of said second binary counter;

the second output terminal of said oscillator being connected to the input terminal of said second binary counter through a second switch activated by said second initiating switch;

whereby, when said second initiating switch is activated, it starts said second reset pulse monostable which in turn resets said second binary counter and sets said second flip-flop, and connects said oscillator to said second binary counter whereby to start a downward count on said second binary counter; and when a fall from the top to the second from top step in said sequential order is detected at the output terminal of said differential amplifier, said edge detector provides a high state pulse to clear said second flip-flop to thereby provide a STOP signal to said oscillator to arrest the oscillator and thereby stop the count of said second binary counter.

14. An apparatus as defined in claim 13 wherein said fault detecting and indicating means comprises a fault detector flip-flop having an input terminal and an output terminal, said DATA input terminal of said fault detector flip-flop being connected to said third from top step of said sequential sequence;

the output terminal of said fault detector flip-flop being connected to alarm indicating means;

whereby, when the multi-level step LED voltage arrangement falls to the third from top step of said sequential order, a fault is indicated and alarm is set of.

15. An apparatus as defined in claim 14 wherein said distance travelled measuring means comprises a pulse generator having a first output terminal, a second output terminal and a third output terminal;

a pulse conditioner having a first input terminal connected to the first output terminal of said pulse generator, a second input terminal being connected to the second output terminal of said pulse generator, and a third input terminal being connected to the third output terminal of said pulse generator, said pulse conditioner having a first output terminal, a second output terminal and a third output terminal;

a pulse doubler having a first input terminal connected to the first output terminal of said pulse conditioner and a second input terminal connected to the second output terminal of said pulse conditioner and an output terminal;

a BCD counter arrangement having a first input terminal connected to the output terminal of said pulse doubler and a RESET terminal connected to the third output terminal of said pulse conditioner, said BCD counter arrangement having output means;

whereby, the distance travelled is measured by the count on said BCD counter arrangement.

16. An apparatus as defined in claim 15 wherein said position module means comprises a latching arrangement having input means and output means;

the input means of said latching arrangement being connected to the output means of said BCD counter arrangement;

whereby, the predetermined distance is set into said latch arrangement by said BCD counter arrangement.

17. An apparatus as defined in claim 16 wherein said signal comparator means comprises a magnitude comparator having a first input means, a second input means and an output means, said first input means of said magnitude comparator being connected to the output means of said BCD counter arrangement, said second input means of said magnitude comparator being connected to the output means of said latch arrangement;

a dual monostable having an input terminal and an output terminal;

said fault detector flip-flop having a CLOCK terminal;

said output terminal of said dual monostable being connected to said CLOCK terminal of said fault detector flip-flop;

whereby, when said magnitude comparator detects that said distance travelled is equal to said predetermined distance stored in said latch arrangement, said dual monostable enables said fault detector means.

* * * * *